(12) United States Patent
De Agostini et al.

(10) Patent No.: US 11,580,633 B2
(45) Date of Patent: Feb. 14, 2023

(54) CONTROL DEVICE AND METHOD OF SECTORS FOR THE ASSEMBLY OF THE TURBINE STATORS OF A TURBINE

(71) Applicant: SAFRAN AIRCRAFT ENGINES, Paris (FR)

(72) Inventors: Enguerrand Frédéric De Agostini, Moissy-Cramayel (FR); Carlos Alves De Matos, Sainte Foy d'Aigrefeuille (FR); Florian Chauvel, Marly (FR); Baptiste Eparvier, Vendine (FR); Mathias Gagliardo, Sainte Foy d'Aigrefeuille (FR); Abner Wysidi, Sainte Foy d'Aigrefeuille (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/519,240

(22) Filed: Nov. 4, 2021

(65) Prior Publication Data
US 2022/0172336 A1 Jun. 2, 2022

(30) Foreign Application Priority Data

Nov. 27, 2020 (FR) ........................................ 2012269

(51) Int. Cl.
*G06T 7/00* (2017.01)
*F01D 9/04* (2006.01)
(Continued)

(52) U.S. Cl.
CPC .............. *G06T 7/001* (2013.01); *F01D 9/042* (2013.01); *F01D 11/122* (2013.01); *F01D 25/24* (2013.01);
(Continued)

(58) Field of Classification Search
CPC ...... F01D 25/24; F01D 25/246; F01D 11/122; F01D 9/042; F01D 9/04; G06T 7/001;
(Continued)

(56) References Cited

U.S. PATENT DOCUMENTS 6,202,302 B1 * 3/2001 Descoteaux ............ B23P 6/002
29/889.1
8,140,308 B2 3/2012 Menuey
(Continued)

FOREIGN PATENT DOCUMENTS

| EP | 2 075 721 A1 | 7/2009 |
| EP | 3 023 735 A1 | 5/2016 |
| EP | 3 517 741 A1 | 7/2019 |

OTHER PUBLICATIONS

France Search Report dated Sep. 7, 2021, issued in Application No. FR2012269, filed Nov. 27, 2020, 2 pages.

*Primary Examiner* — Igor Kershteyn
(74) *Attorney, Agent, or Firm* — Christensen O'Connor Johnson Kindness PLLC

(57) ABSTRACT

A control device controls sectors for the assembly of turbine stators of a turbine. Each turbine stator is formed of an assembly of sectors juxtaposed to one another, and each sector has a reference. The control device includes an automated system for identifying the sector with means for reading the sector reference, a database of the references of the sectors that form the turbine stators of the turbine, and means for associating the read reference of the sector with a determined turbine stator of the turbine.

8 Claims, 11 Drawing Sheets

(51) Int. Cl.
*F01D 11/12* (2006.01)
*F01D 25/24* (2006.01)

(52) U.S. Cl.
CPC ...... *F05D 2230/60* (2013.01); *F05D 2240/14* (2013.01); *F05D 2250/283* (2013.01); *G06T 2207/30164* (2013.01)

(58) Field of Classification Search
CPC ....... G06T 2207/30164; F05D 2230/50; F05D 2230/51; F05D 2230/68; F05D 2230/60; F05D 2240/14; F05D 2250/283; F05D 2260/30
See application file for complete search history.

(56) References Cited

U.S. PATENT DOCUMENTS

| | | | |
|---|---|---|---|
| 2004/0120814 A1* | 6/2004 | Brainch | F01D 9/041 415/209.3 |
| 2004/0170499 A1* | 9/2004 | Powis | F01D 5/189 416/97 R |
| 2005/0167531 A1* | 8/2005 | Soupizon | F01D 11/006 239/533.1 |
| 2006/0147299 A1* | 7/2006 | Iacopetti | F01D 25/12 415/115 |
| 2007/0122275 A1* | 5/2007 | Busch | F01D 9/042 415/209.3 |
| 2007/0297900 A1* | 12/2007 | Abgrall | F01D 9/041 415/209.3 |
| 2022/0172336 A1* | 6/2022 | De Agostini | F01D 9/04 |

* cited by examiner

CONTROL DEVICE AND METHOD OF SECTORS FOR THE ASSEMBLY OF THE TURBINE STATORS OF A TURBINE

CROSS-REFERENCE TO RELATED APPLICATION

This application claims priority to FR 2012269, filed Nov. 27, 2020, the disclosure of which is hereby expressly incorporated by reference herein in its entirety.

TECHNICAL FIELD

The present disclosure is directed to aeronautical engines and more particularly that of the turbomachines. In particular, the disclosure relates to an installation and a method for assembling the turbine stators of a turbomachine turbine.

BACKGROUND

The aeronautical turbomachines typically comprise several modules such as a low-pressure (LP) compressor followed by a high-pressure (HP) compressor, a combustion chamber, a high-pressure turbine followed by a low-pressure turbine, which drive the corresponding LP or HP compressor, and a system for ejecting the gas.

Each of the turbines of such machines typically comprises several stages each comprising an annular row, or ring, of stationary vanes supported by a casing of the turbine and an annular row of vanes rotatably mounted about a central axis of rotation. The stationary inner blading rings of a turbine are also called turbine stators.

In order to facilitate their assembly and to reduce their manufacturing costs, the stationary blading rings are often made in the form of an assembly of angular sectors which are juxtaposed one beside the other until they form a whole ring of stationary bladings.

It is necessary to ensure that there is at least a relative seal between two adjacent angular sectors in order to avoid air leaks which are particularly detrimental in particular to the proper cooling of these sectors and which could also lead to a reduction in the performance of the engine or even damage to pieces located downstream.

For this purpose, it is known to interpose sealing tabs or pads between the adjacent sectors. Such pads are generally housed in substantially axial and/or radial slots fitted in adjacent side faces of the sectors. The document FR3033827 describes such a sealing pad set for gas turbine.

However, these sealing pads are not easy to install.

Conventionally, the preparation of the angular sectors for their assembly to form the turbine stators of a turbine is essentially manual. In fact, an operator identifies the sectors one by one in order to determine to which turbine stator they correspond. The operator then visually controls the quality and the conformity of each sector and then places grease in the slots of the sectors for the insertion of the sealing pads. The operator identifies the type of pads to be inserted and inserts them one after the other into the slots on one side of the sector, and this for each sector. This step of inserting the sealing pads is meticulous and therefore time consuming.

In addition, certain angular sectors for predetermined turbine stators also need to be equipped with an anti-wear device, or foil, allowing to limit wear between a hook on the casing and a means of hooking the sector of the turbine stator onto the casing. The document FR2938872 describes such an anti-wear device for a turbine stator of turbine of an aeronautical turbomachine.

For example, the rear turbine of the LEAP engine comprises seven turbine stators consisting of 146 sectors, and requiring thus the insertion of 834 pads and the dropping of 78 foils for their assembly.

The repetitive operations for the preparation of the turbine stator sectors can be the cause of musculoskeletal disorders, in particular at the level of the hands, due to the repetitive use of grease guns or syringes and the insertion of the pads. These repetitive operations can also be a source of errors and therefore a loss of quality in the final assembly of the turbine stators.

Given the growing demand for this type of engine, there is a need to reduce the assembly cycles while ensuring a maximum assembly quality.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To this end, the present disclosure proposes a control device of sectors for the assembly of turbine stators of a turbine, each turbine stator being formed of an assembly of sectors juxtaposed to one another, each sector comprising a reference, the device comprising: an automated system for identifying the sector comprising means for reading the sector reference, a database of the references of the sectors intended to form the turbine stators of the turbine, and means for associating the read reference of the sector with a determined turbine stator of the turbine.

Advantageously, the disclosed subject matter allows to increase the profitability of the production line by eliminating repetitive tasks in the preparation of the sectors.

In fact, the installation according to the invention allows to replace the manual operations of the prior art by automated operations and thus more easily reproducible and faster.

In addition, the automation of the preparation of the sectors forming the turbine stators, and in particular the insertion of the sealing pads, greatly allows to reduce the risk of musculoskeletal disorders for the operators.

The input carriage is filled with the set of the sectors intended to form the set of the turbine stators of the different stages of a turbine, in particular of a low pressure turbine. Thus, the method for assembling the turbine stators is implemented only once for an entire engine, thus limiting the number of operator interventions and increasing the efficiency and the profitability of the installation.

Similarly, the output carriage is intended to receive the set of the sectors pre-assembled in a turbine stator on each tray, also limiting the number of operator interventions and thus increasing the efficiency of the installation.

The operator then becomes a supervisor of the installation, ensuring that the installation is working properly and that the method for assembling the sectors is running properly.

The automation of the assembly process allows to increase the repeatability of the steps of the method while guaranteeing a permanent control of the assembling of the turbine stators of the turbine, thus ensuring a gain in quality.

In addition, the disclosed subject matter thus allows to greatly reduce the assembly time of the turbine stators of a turbine of such an engine from about ten hours to a few dozen minutes.

The control device according to the disclosed subject matter may comprise one or more of the following characteristics, taken in isolation from each other or in combination with each other: the references of the sectors comprise characters that vary from one sector to another sector and characters that are invariant from one sector to another sector of the same turbine stator, the automated system for identifying the sector comprises means for verifying each invariant character read by comparison with the invariant characters of the references of the database, and means for identifying each variant character read by comparison with the variant characters of the references of the database; each sector comprises an inner platform, an outer platform, vanes each comprising a trailing edge and being attached between said inner platform and said outer platform and a block of abradable honeycomb material extending towards the inside of the inner platform between the side faces, and the database comprises a set of technical characteristics of the sector associated with each reference, the set of technical characteristics including at least a determined number of slots arranged in side faces of the sector; technical characteristics of the slots, physical characteristics of the sealing pads intended to be inserted in each of the slots, a determined number of vanes of the sector, an angular position of the sector in the determined turbine stator; the control device comprises an automated system of quality control of the sector configured to control the quality, according to the technical characteristics of the sector, of the slots arranged in the side faces of the sector, the trailing edges and the surfaces of the vanes, and the block of abradable honeycomb material; the control device comprises image capturing means of the sector according to different orientations of the sector with respect to the image capturing means, the sector being supported by a robot arm movable with respect to the image capturing means.

The present disclosure also relates to an installation for pre-assembling the turbine stators of a turbine, the turbine comprising a plurality of turbine stators each formed from an assembly of sectors juxtaposed to one another, the installation comprising: an input carriage configured to convey and support a set of sectors intended to form the turbine stators of the turbine, a robot arm comprising a means for gripping one of the sectors of the input carriage, and a control device as described hereinbefore adapted to control a sector gripped by the gripping means of the robot arm.

The disclosed subject matter also relates to a method for controlling the sectors for the assembly of the turbine stators of a turbine by means of a control device as described hereinbefore, the control method comprising, for each sector of the automated steps of: reading the reference of the sector, and associating the read reference of the sector with a determined turbine stator of the turbine as a function of the database of the references of the sectors intended to form the turbine stators of the turbine.

The control method according to the disclosed subject matter may comprise one or more of the following characteristics, taken in isolation from each other or in combination with each other: the references of the sectors comprise characters that vary from one sector to another sector and characters that are invariant from one sector to another sector of the same turbine stator, the method comprising an automated step for identifying the sector comprising: verifying each invariant character read by comparison with the invariant characters of the references of the database, and identifying each variant character read by comparison with the variant characters of the references of the database; the control method comprises an automated step of quality control of the sector according to the technical characteristics of the sector, comprising quality control of: the slots arranged in the side faces of the sector, the trailing edges and the surfaces of the vanes, and the block of abradable honeycomb material; the turbine stators are low pressure turbine stators.

The disclosed subject matter also relates to a computer program product comprising one or more sequences of stored instructions which are accessible to a processor and which, when executed by the processor, cause the processor to perform the automated steps of the pre-assembly method as previously described.

Unless otherwise specified, the terms such as "computation", "generation", or the like, refer to the action and/or the processes of a computer or computer system, or similar electronic computing device, which manipulates and/or transforms data represented as physical quantities, such as electronic quantities, in the registers and/or memories of the computer system into other data similarly represented as physical quantities in the memories of the computer system, registers or other information storage, transmission or display devices.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

In the various figures, identical reference numbers designate identical pieces or pieces with similar functions. In addition, the various elements are not necessarily shown to scale in order to present a view allowing to facilitate the understanding of the present disclosure.

By axial direction, we designate by extension any direction parallel to an axis A of a turbomachine, and by radial direction any direction perpendicular and extending radially with respect to the axial direction.

DETAILED DESCRIPTION

While illustrative embodiments have been illustrated and described, it will be appreciated that various changes can be made therein without departing from the spirit and scope of the present disclosure.

Figure 1:
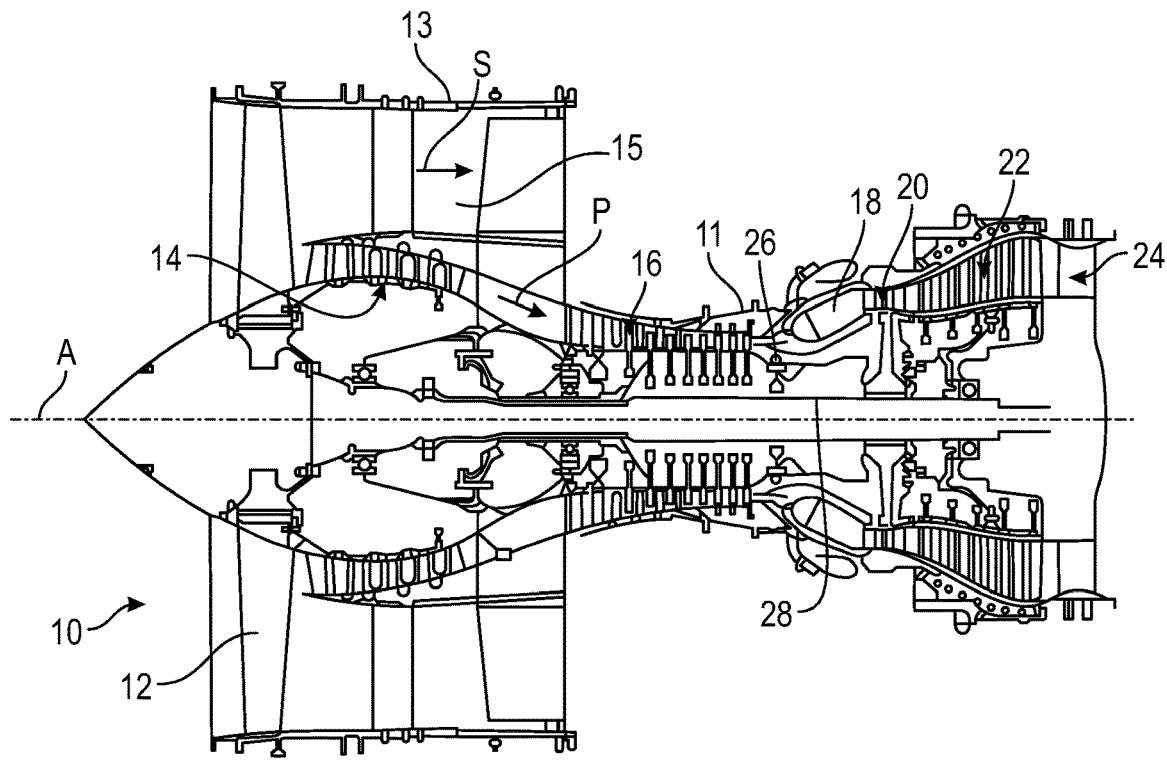
FIG. 1 is a schematic cross-sectional view of a turbomachine according to the prior art.

FIG. 1 illustrates a turbomachine 10 with longitudinal axis A of the double-flow type. Such a turbomachine 10, here a turbojet engine 10, comprises in a known manner a fan 12, a low pressure (LP) compressor 14, a high pressure (HP) compressor 16, a combustion chamber 18, a high pressure (HP) turbine 20, a low pressure (LP) turbine 22 and an exhaust nozzle 24. The rotor of the HP compressor 16 and the rotor of the HP turbine 20 are connected by a high pressure HP shaft 26 and form a high pressure body with it. The rotor of the LP compressor 14 and the rotor of the low-pressure LP turbine 22 are connected by a LP shaft 28 and form a low-pressure body with it.

A primary air flow "P" passes through the high and low pressure bodies and the fan 12 produces a secondary air flow "S" which circulates in the turbojet engine 10, between a casing 11 and an outer shell 13 of the turbojet engine, in a cold flow channel 15. At the exit of the nozzle 24, the gases from the primary flow "P" are mixed with the secondary flow "S" to produce a propulsion force, the secondary flow "S" providing the majority of the thrust.

The compressors LP 14 and HP 16 and the turbines HP 20 and LP 22 each comprise several compressor or turbine stages.

Figure 2:
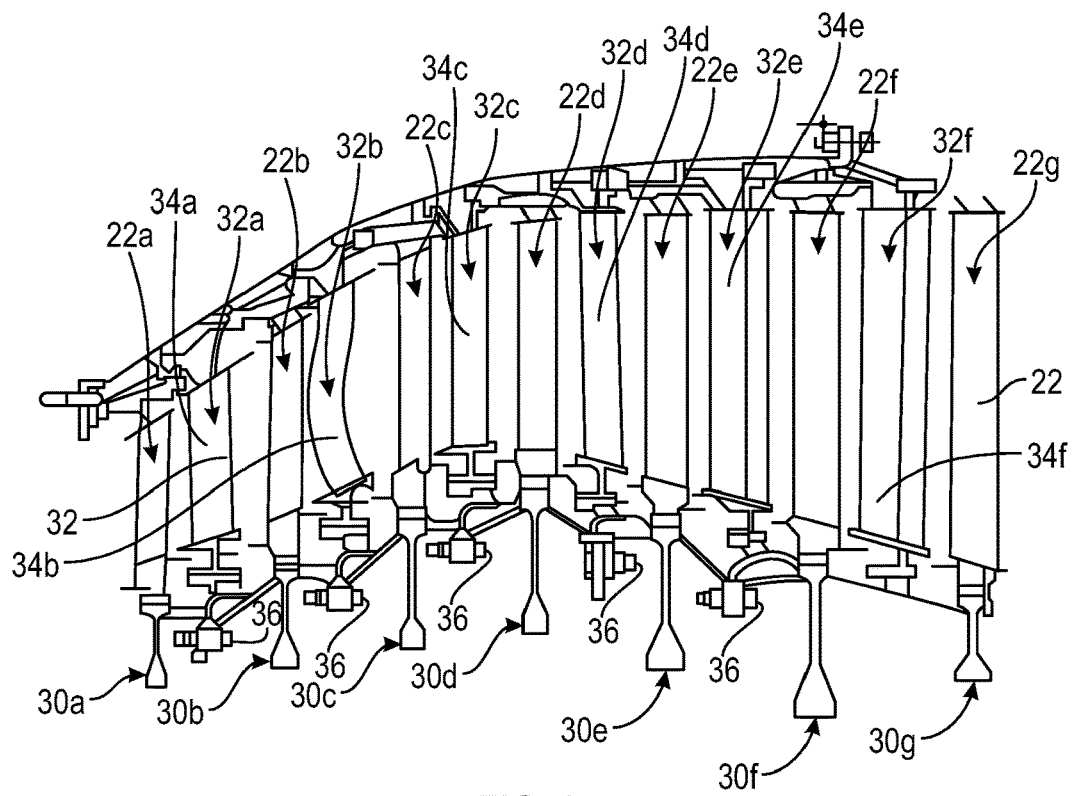
FIG. 2 is a cross-sectional detail view of a low pressure turbine of the turbomachine of FIG. 1 comprising seven stages.

As illustrated, for example in FIG. 2, the LP turbine 22 comprises a plurality of movable blading impeller 22a, 22b, 22c, 22d, 22e, 22f, 22g of turbine, the blading of which are carried by associated discs 30a, 30b, 30c, 30d, 30e, 30f, 30g which are assembled to each other by bolts 36.

The LP turbine 22 further comprises stationary blading rings 32a, 32b, 32c, 32d, 32e, 32f of a turbine stator 32 which are interposed between the turbine movable blading impellers 22a, 22b, 22c, 22d, 22e, 22f, 22g.

Each ring of stationary bladings 32a, 32b, 32c, 32d, 32e, 32f of the turbine stator is formed by an assembly of sectors 34a, 34b, 34c, 34d, 34e, 34f of stationary blading rings, assembled around the axis A of the turbomachine over 360° so as to constitute a complete ring of stationary bladings 32a, 32b, 32c, 32d, 32e, 32f around the axis A of the turbomachine.

Figure 3:
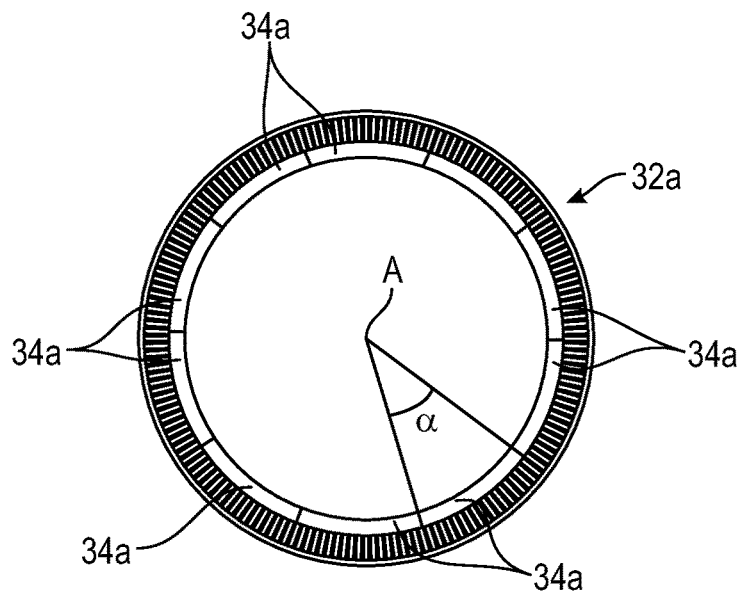
FIG. 3 is a schematic end view of a turbine blading comprising an assembly of blading angular sectors.

FIG. 3 shows, as a simplified example, a turbine stator blading 32a made up of an assembly of ten blading sectors 34a. Of course, the number of angular sectors to form a turbine stator can be different from one stage to another of the turbine. For example, the bladings 32 of the turbine stators of the various stages of a low pressure turbine consist of an assembly of 21 or 26 blading sectors 34.

As illustrated in FIG. 3, each sector 34a extends at a determined angle α about the axis of the ring 32a, which corresponds to the axis A of the turbomachine 10 previously illustrated in FIG. 1.

The term "lower" or "inner" refers to any positioning close to the axis A in the radial direction, whereas the term "upper" or "outer" refers to any positioning further from the axis A in the radial direction than the lower positioning. Finally, "transverse" means any plane or any surface comprising the longitudinal axis A and parallel to a section plane of a sector 34.

Figure 4:
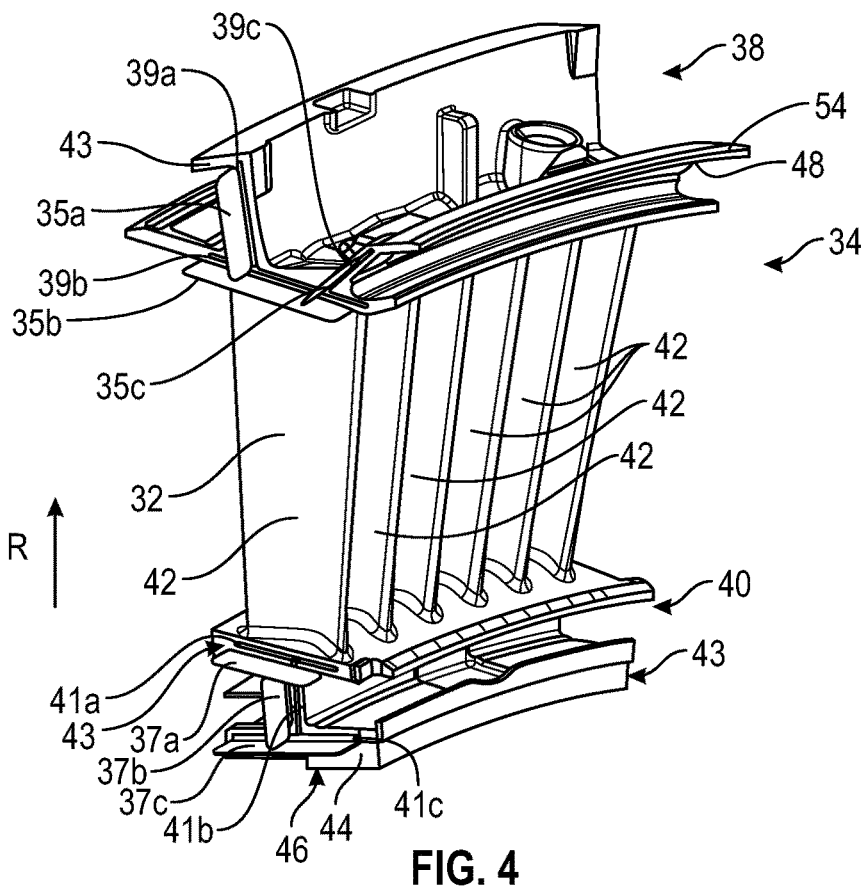
FIG. 4 is a perspective view of a blading sector of one of the turbine stators of the turbine of FIG. 2.

Conventionally, as illustrated in FIG. 4, each sector 34 comprises, with respect to the axis A of the blading 32, a radially outer platform 38, a radially inner platform 40, at least two vanes 42 which extend substantially along a radial direction R between said platforms 38, 40. In the illustrated example, the sector 34 comprises six vanes 42. However, the number of vanes may differ from one stage of the turbine to another. Each sector further comprises at least one block 44 of abradable honeycomb material which accordingly also extends inwardly of the inner platform 40 between transverse ends (not shown) of the angular sector 34.

A radially inner face of radial sealing 46 of the block 44 of abradable honeycomb material is configured to cooperate with wipers of a labyrinth seal carried by a rotor of the turbomachine.

Conventionally, as illustrated in FIG. 4, the sealing between adjacent sectors 34 is carried out by means of pads 35a, 35b, 35c, 37a, 37b, 37c which are received in housings or slots 39a, 39b, 39c, 41a, 41b, 41c which are arranged opposite each other between the sectors 34 to form a barrier to a recirculation flow from downstream to upstream between the sectors 34. According to the illustrated example, this sector 34 comprises six slots provided in side faces 43 of the sector, including three upper slots 39a, 39b, 39c, formed in its outer platform 38, which each receive a pad 35a, 35b, 35c, and three lower slots 41a, 41b, 41c formed in its inner platform 40, which each receive a pad 37a, 37b, 37c. The orientation of the slots and thus of the pads may be tangential (39b, 41a, 41c), radial (39a, 41b) or of any orientation (39c).

The slots in each sector whether provided in the side surfaces of the outer platform 38 or in the inner platform 40 form a pattern comprising at least one intersection of two slots. In the illustrated example, the slots provided in the side surfaces of the outer platform 38 form a pattern of the K type while the slots provided in the side surfaces of the inner platform 40 form a pattern of the H type. Of course, the pattern of both the slots of the inner platform 40 or outer platform 38 may vary from one stage of the turbine to another.

Figure 5:
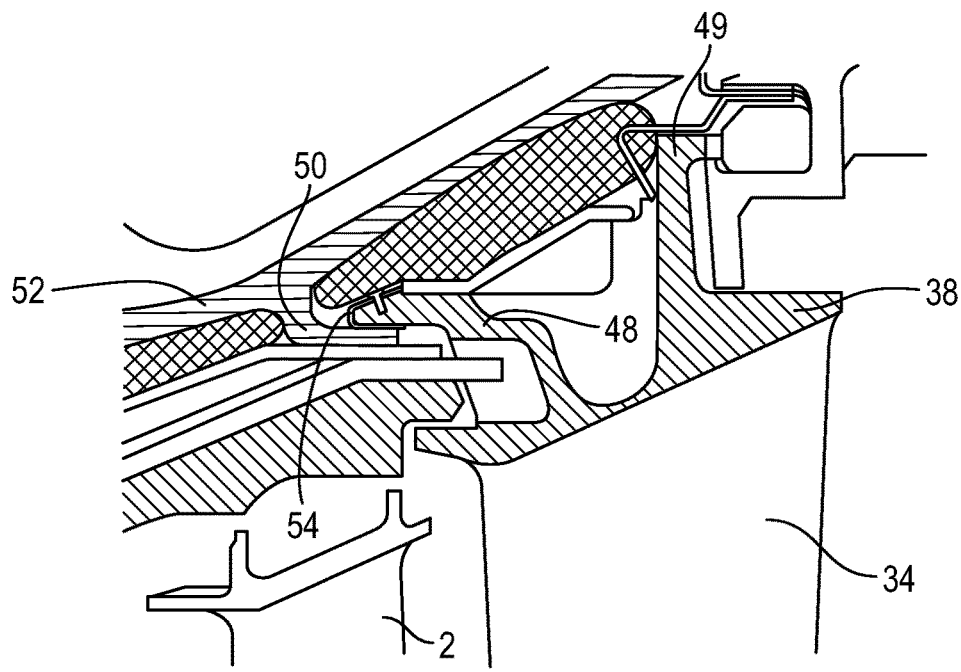
FIG. 5 is a radial cross-sectional view of an attachment system of a turbine stator blading sector of a second stage of the low pressure turbine of FIG. 2, the outer platform of the sector being equipped with an anti-wear device.
Figure 6:
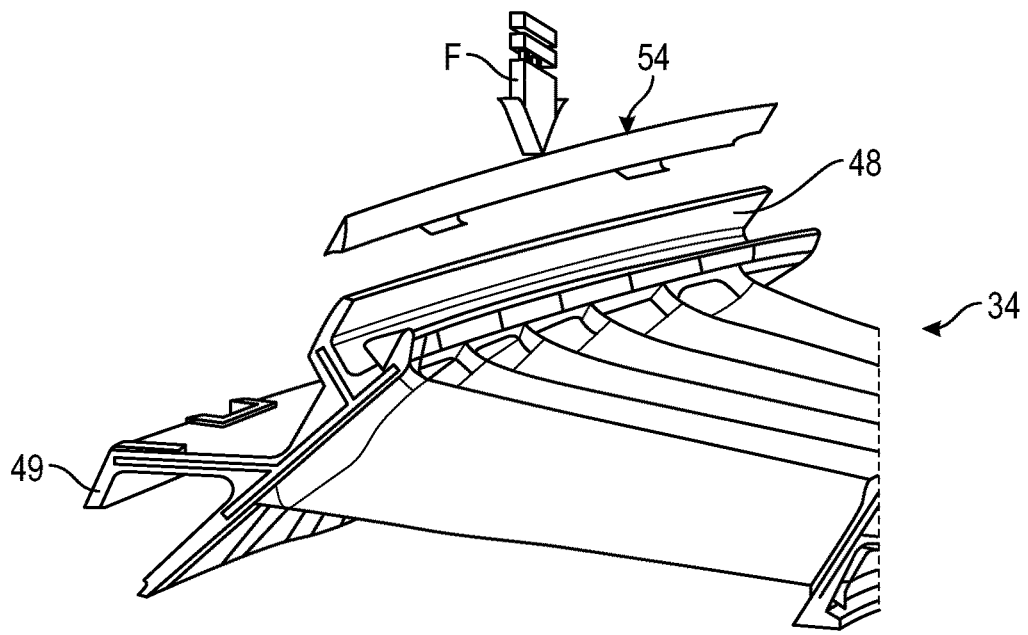
FIG. 6 is a perspective view of the assembly of an anti-wear device on the sector of FIG. 4.

Referring to FIG. 5, for certain low pressure turbine stages, the outer platform 38 of a turbine stator sector 34 comprises a front rail 48 and a back rail 49. The front rail 48 rests on a hook 50 of the low pressure turbine casing 52. The front rail 48 is in the form of a radially extending tongue in cross-section, terminating in a rounded end, to which an anti-wear device 54 or foil is secured and which conforms to its shape. Its radial cross-section is a U-shaped, adapted to envelop the end of the tongue of the front rail 48 and it extends at its lower part until it protrudes axially from the back end of the hook 50. The foil is interposed between said front hooking means and said support when the sector is assembled to the casing in order to thus ensure the mechanical interface between the front rail 48 and the hook 50 and to eliminate any direct contact between them. As shown in FIG. 6, the foil 54 is clipped to the front rail 48 according to the arrow noted F.

Figure 7:
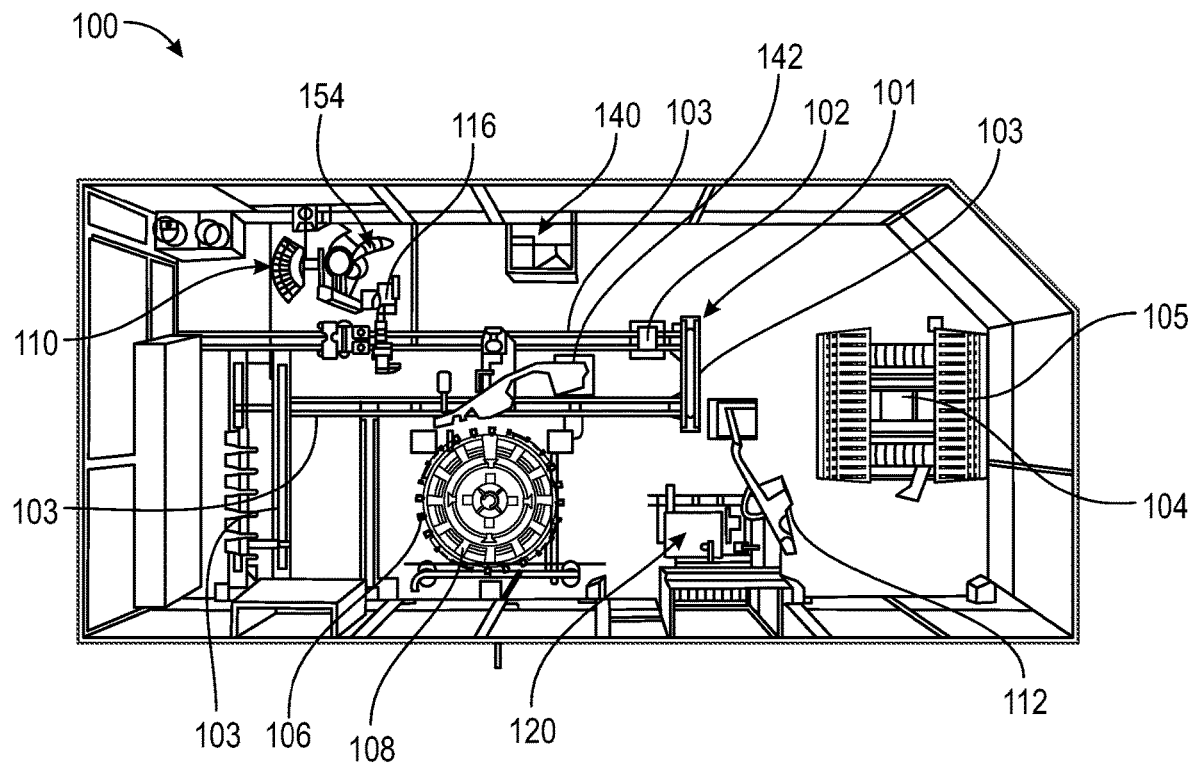
FIG. 7 shows a top view of an installation for pre-assembling the turbine stators of the various stages of a turbine according to the invention.

FIG. 7 illustrates an installation 100 for pre-assembling the turbine stators of the various stages of a turbine according to another representative embodiment of the present disclosure. The installation according is adapted to prepare, in an automated manner, the different sectors of the set of turbine stators of the different stages of a turbine, in particular of a low pressure turbine.

The installation comprises a computer-readable storage medium on which is recorded one or more sequences of instructions forming a computer program, a processor and a man-machine interface or console (not illustrated) configured to control the various automated elements of the installation. The instruction sequences are accessible by the processor and cause the processor to execute the automated steps of the pre-assembly method according to the present disclosure when executed by the processor. They allow to control the automated devices, the robot arms and the conveying device of the installation.

Such an installation 100 according to the present disclosure comprises several functional units which will be described hereinafter, and a conveying device 101 adapted to convey sectors 34 in particular between the different functional units so that they interact with the conveyed sectors.

The various functional units are, for example, adapted to insert sealing pads into the slots of the sectors, to clean the slots of the sectors prior to the insertion, to check the quality of the sectors, to equip sectors with foils if required, etc. Such functional units will be described in detail below.

The conveying device 101 is automated and comprises pallets 102, each adapted to convey a sector 34. The sectors 34 are supported by the pallets 102 and locked in a predefined position and orientation. For example, the conveying device 101 comprises a network of linear rails 103 allowing the displacement of the pallets between the different functional units.

The installation further comprises a plurality of robot arms each comprising a base attached to a frame of the installation, an articulated arm and at least one tool arranged at the free end of the articulated arm. In a known way, the tool is most often a gripping tool, for example a clamp with two or three fingers. The robot arms can also support other equipment and accessories, such as a camera. Such robot arms are adapted to position and orientate the tool carried by its end precisely in six degrees of freedom.

Each robot arm is adapted and configured to perform a determined number of actions different from those performed by another robot arm, the robot arms then being in action simultaneously, thus allowing to reduce the time required to prepare the sectors and their pre-assembly to form the turbine stators of the turbine. In addition, the robot arms can work with several functional units, allowing to reduce the number of robot arms required for the pre-assembly of the turbine stators of a turbine and therefore to optimize the space required for such an installation.

The installation 100 further comprises:
an input dock 104 for receiving an input carriage 105,
an automated device 110 for inserting sealing pads 35, 37, and
an output dock 106 for receiving an output carriage 108.

The automated device 110 for inserting sealing pads 35, 37 will be detailed later.

The input carriage 105 is configured to convey and support a set of sectors 34a, 34b, 34c, 34d, 34e, 34f as previously described intended to form the set of turbine stators 32a, 32b, 32c, 32d, 32e, 32f of the various stages of the turbine. More precisely, the set of sectors comprises as many sub-sets as there are stages to the turbine and therefore as many turbine stators to be assembled for the turbine. Thus, each sector is associated with a given turbine stator of the turbine.

Figure 8:
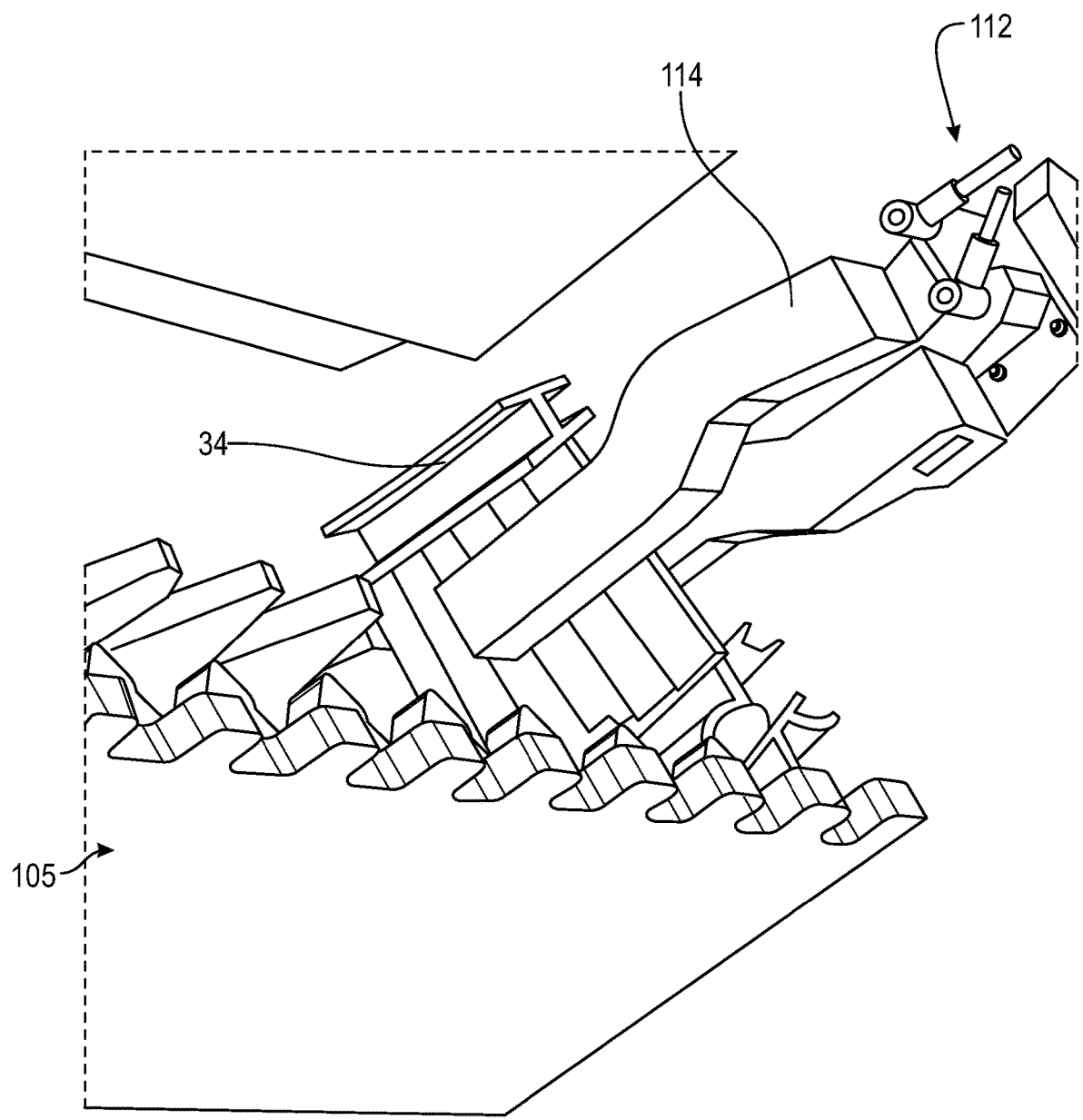
FIG. 8 shows a schematic view of the gripping of a sector in an input carriage by a robot arm of the installation of FIG. 7.

The installation 100 comprises a first robot arm 112 adapted to grip a sector 34 from the input carriage 105 and to deposit it on a pallet of the conveying device. To this end and as illustrated in FIG. 8, the first robot arm 112 comprises a gripping tool 114, for example a clamp, configured to grip a sector 34 both in the input carriage 105 and to deposit it on a pallet 102 of the conveying device.

Figure 9:
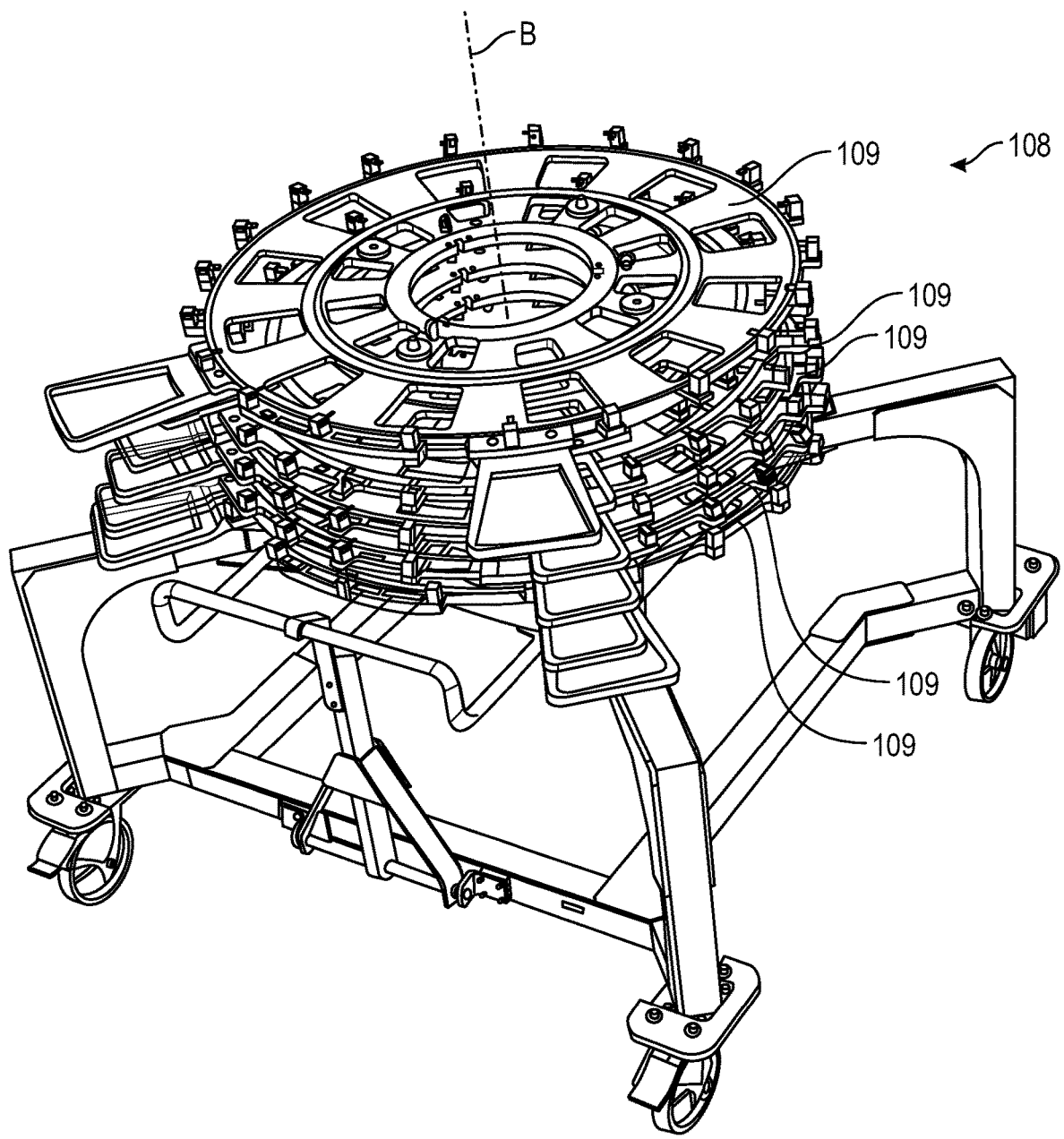
FIG. 9 shows a schematic perspective view of an output carriage of the installation of FIG. 7.

An example of output carriage 108 is shown in FIG. 9 and comprises a plurality of horizontal annular trays 109, each tray 109 being associated with a turbine stator of a stage of the turbine to be assembled. Thus, each tray 109 is intended to receive and support equipped sectors of a sub-set thus associated with a given turbine stator so that the equipped sectors can be placed end-to-end to form the turbine stator. Thus, the pads 35, 37 of the equipped sectors are arranged opposite the slots 39, 41 of an adjacent sector 34 for insertion therein during the final assembly of the turbine stator. By equipped sector is meant a sector 34 equipped with the pads 39, 41 in one of its side faces and also equipped with a foil 54 if necessary for a certain number of predefined sectors depending on the stage of the turbine for which the sectors are intended.

The annular trays are coaxial and can be moved independently of each other about their common axis, noted B.

The installation 100 comprises a second robot arm 142 adapted to grip a sector 34 equipped and conveyed by a pallet 102 of the conveying device 101 and to deposit it and position it on the tray 109 associated with the given turbine stator so as to pre-assemble the given dispenser.

To this end, the output dock 106 comprises a first actuator (not shown) configured to lift the upper trays to the tray 109 on which the equipped sector is to be dropped and thereby disengage the upper trays to make the tray 109 on which the equipped sector is to be dropped accessible.

In addition, the output dock 106 comprises a second actuator (not shown) configured to rotate on itself the tray 109 on which the equipped sector is to be dropped in order to make accessible the location where the equipped sector is to be positioned.

The installation 100 further advantageously comprises:
a device 120 for controlling the sectors 34,
an automated system for dropping the anti-wear devices, and
an automated system 140 for cleaning the slots of the sectors 34.

The control device 120 comprises an identification system 122 and a system for controlling the quality of the sector 124.

The identification system 122 is automated and configured to identify the sector 34 supported by a robot arm, preferably by the first robot arm 112. In other words, the automated identification system 122 is configured to identify which turbine stator 32 of the turbine is associated with the sector 34 supported by the gripping tool 114 of the first robot arm 112. Thus, the system 122 for identifying the sector is also configured to identify the tray 109 of the output carriage 108, associated with the identified turbine stator 32, on which to deposit the sector 34 and position it in the proper location for the pre-assembly of the given turbine stator.

To this end, each sector 34 comprises a surface marking such as a reference, preferably alphanumeric, and the identification system 122 comprises a means for reading the reference communicating with an acquisition means, for example a camera associated with a character recognition software, the acquisition means being supported by another robot arm of the installation, preferably by the second robot arm 142.

The device 120 for controlling the sectors comprises a database of the references of the set of the sectors intended to form the turbine stators of the turbine, and a means for associating the reference read with an identified turbine stator 32 of the turbine. The database of the references takes into account in particular the typography, the font and the size of the different characters that make up the reference.

The references 34 of the sectors comprise characters that vary from one sector to another sector and characters that are invariant from one sector to another sector for a same turbine stator 32. Advantageously, the automated system 122 for identifying the sector comprises a means for verifying each invariant character read by comparison with the invariant characters of the references in the database, and a means for identifying each variant character read by comparison with the variant characters of the references in the database. Thus, this reading as described above allows to limit the risk of reading one character instead of another and thus to make the reading of the references of the sectors more reliable.

Preferably, the database comprises a set of technical characteristics associated with each reference and therefore with each sector. The set of technical specifications comprises at least a given number of slots provided in the side faces of each sector, technical characteristics of the slots such as the orientation and the dimensions of the slots, physical characteristics of the pads intended to be inserted into each of the slots, e.g. the shape and the dimensions of the pads, a given number of vanes of each sector and the final angular position of the sector in the given turbine stator. The database comprises the number of anti-wear devices intended to equip certain sectors and for which sector they are intended.

The system 124 for controlling the quality of the sector is automated and adapted to control the quality of the sector supported by a robot arm, preferably by the first robot arm 112. The control system 124 is configured to control the compliance of the sector with the quality standards for the aviation industry.

In particular, the control system 124 is configured to control at least the quality of the slots 35, 37 provided in the transverse walls of the sector 34, the quality of the trailing edges and the surfaces of the vanes 42 of the sector 34, and the quality of the honeycomb abradable material block 44 of the sector 34.

Figure 10:
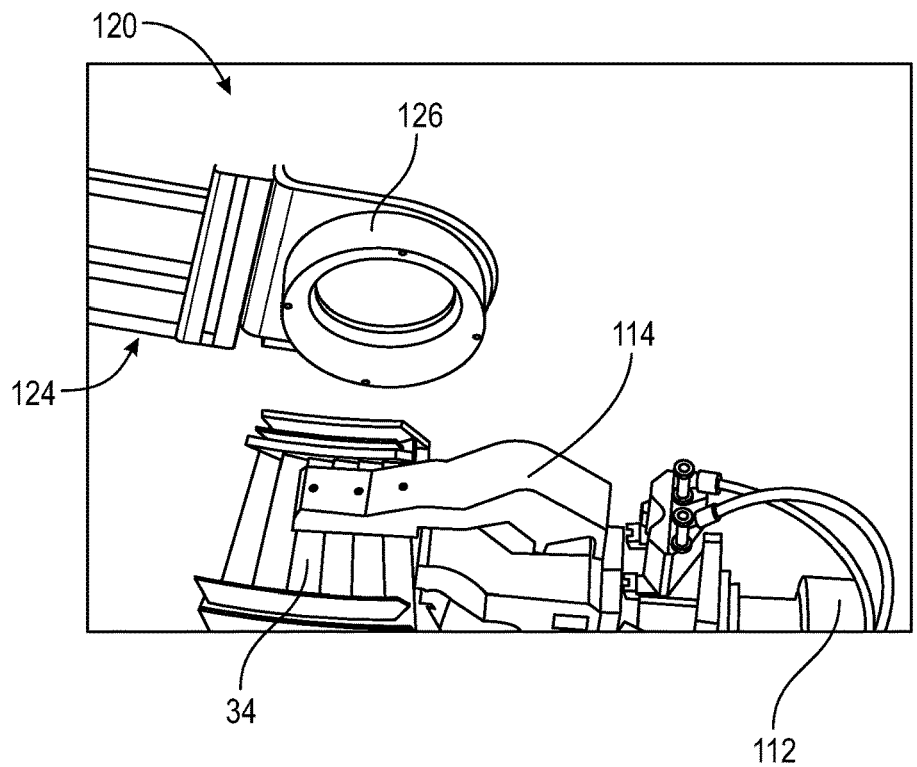
FIG. 10 shows a schematic and enlarged view of a control system of the quality of a sector supported by a robot arm of the installation of FIG. 7.

To this end, the control system 124 comprises a means for capturing images 126 of the sector 34 while the sector 34 is supported by the first robot arm 112 as shown in FIG. 10. Thus, the first robot arm 112 is adapted to orient the sector 34 in different orientations relative to the image capturing means, such as a camera.

The automated control system 120 allows a follow-up of the sectors used for the pre-assembly of the turbine stators of the turbine and thus improves the quality and the reliability of their pre-assembly and thus of their final assembly.

The system for dropping an anti-wear device or foil is also automated. It is adapted to interact with a number of predefined sectors conveyed by the automated conveying device 101.

The foil dropping system comprises a multiple support for the foils intended to equip the predefined sectors and an intermediate support.

A robot arm of the installation, preferably the first robot arm 112, is adapted and configured to grip a foil from the multiple support and to deposit it on the intermediate support. For example, the first robot arm 112 comprises another gripping means, such as a small sized clamp adapted to grip the foil. The intermediate support is shaped to support the foil in a predetermined position and orientation so that the foil can be attached to the sector. The first robot arm 112 is configured to then grip the sector 34 of a transport pallet 102 and position and orient it relative to the foil dropped on the intermediate support so as to secure the foil to the sector. Preferably, the foil 54 is secured, for example by clipping, so as to envelop the front end of the front hooking means 48 and to be interposed between said front hooking means 48 of the sector 34 and the hook 50 of the casing 52 when the turbine stator is fixed to the casing.

The cleaning system 140 is automated and configured to clean the slots 35, 37 of a sector 34 supported by a robot arm, preferably the second robot arm 142. Preferably, the automated cleaning system 140 comprises a compressed air system for cleaning the interior of the slots 39, 41.

The second robot arm 142 is configured to grip the sector 34 of a transport pallet 102 and position and orient it relative to the cleaning system 140, in particular relative to a compressed air jet nozzle for cleaning the interior of the slots 39, 41.

Figure 13:
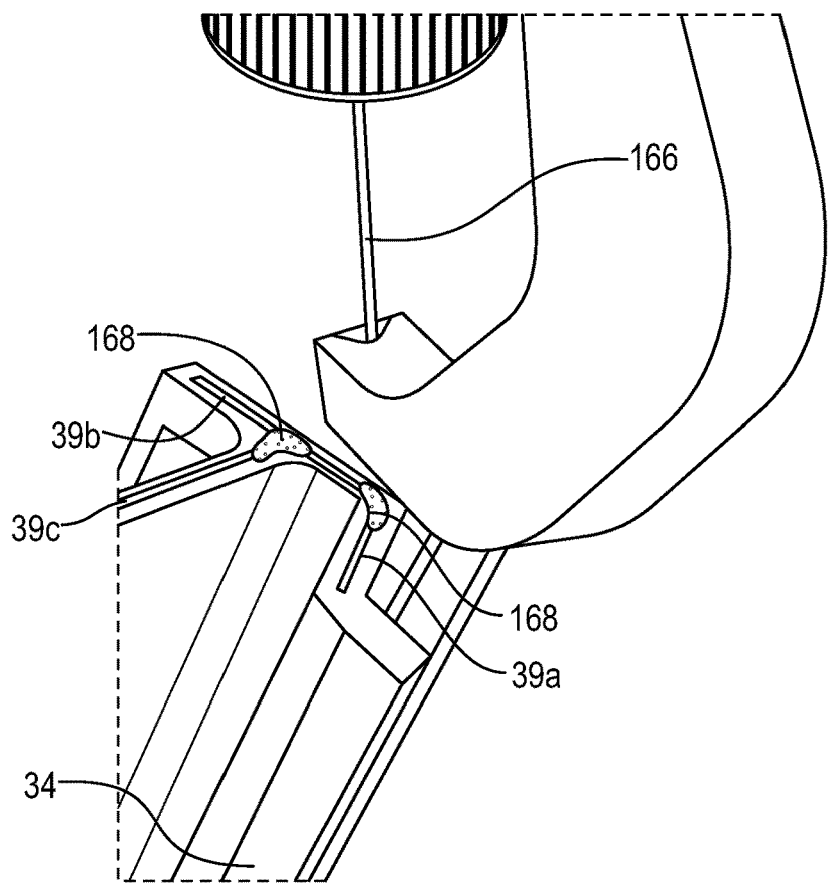
FIG. 13 illustrates an enlarged schematic view of a greasing system comprising a means for injecting a fatty material into the slots of a sector.

The installation 100 advantageously further comprises an automated greasing system 164 adapted to inject a fatty material into at least one portion of the slots 39, 41 of a sector 34 supported by a robot arm, preferably the second robot arm 142 of the installation. With reference to FIG. 13, the greasing system 164 comprises, in particular, a means for injecting 166 a fatty material 168, such as grease. The fatty material 168 is injected into at least each intersection between two slots of the sector. The second robot arm 142 is configured to grip the sector 34 of a transport pallet 102 and position and orient it relative to the greasing system 164, in particular relative to the injection means 166 for depositing grease within the slots 39, 41.

For this purpose, the installation 100 is configured to have a regulated temperature adapted to the fatty material by means of an air conditioner, in particular to regulate the viscosity of the fatty material. The injection means 166 is, for example, a needle or a syringe, as shown in FIG. 13.

Preferably, the cleaning system 140 and the greasing system 164 are combined in order to deposit the fatty material immediately after cleaning the slots, thereby allowing to optimize the space in the installation and saving time.

The device 110 for inserting sealing pads is automated and adapted to interact with a sector 34 supported by a pallet 102 of the conveying device 101.

The device 110 comprises a third robot arm 116 configured to insert sealing pads 35, 37 into the slots in a side face of the sector 34 to form an equipped sector.

Figure 11:
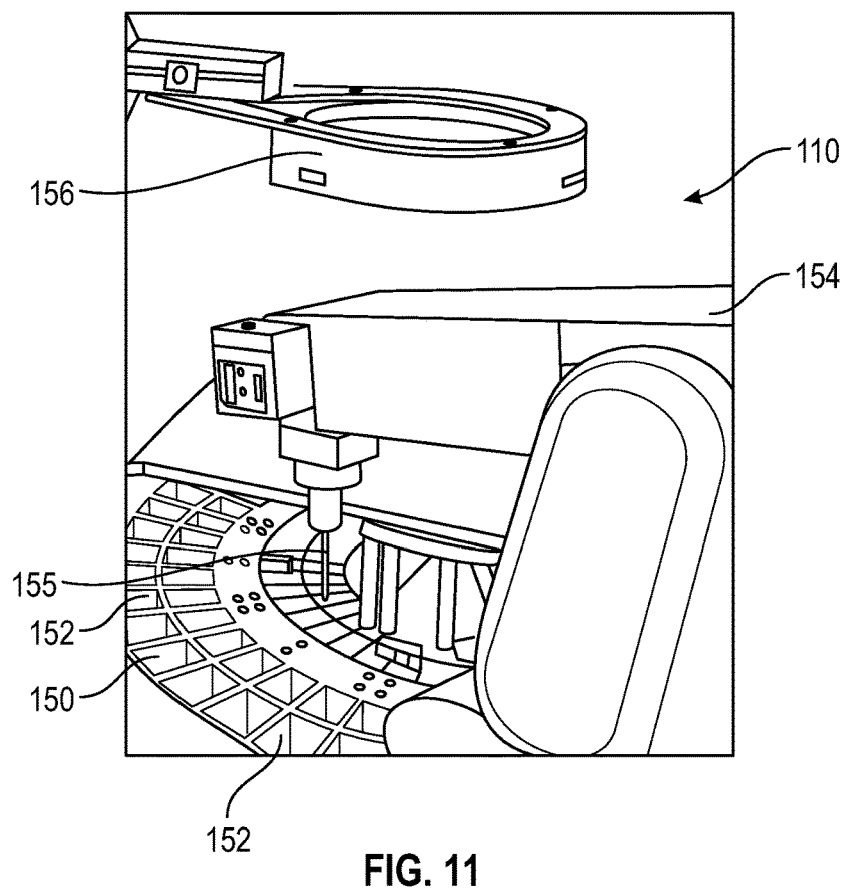
FIG. 11 illustrates an enlarged schematic view of a system for preparing a pad to be inserted into a sector of the installation of FIG. 7.

As illustrated in FIG. 11, the device 110 for inserting sealing pads further comprises a sealing pads preparation system 35, 37 comprising a receptacle 150, a fourth robot arm 154 and a pads support (not shown). The system for preparing sealing pads is automated.

The receptacle 150 is adapted to receive and contain a plurality of sealing pads 35, 37. It comprises a plurality of bins 152 each containing loose sealing pads 35, 37. Each bin 152 comprises a same type of pads 35, 37, i.e. having the same shape and dimensions. The type of pads is different from one bin to another.

The fourth robot arm 154 comprises a gripping means 155 adapted to grip sealing pads 35, 37 in the receptacle and to deposit them on the pad support. For example, the gripping means 155 of the fourth robot arm 154 is by air suction, for example a suction finger.

The fourth robot arm 154 is configured to successively grip pads of different types and thus intended for different slots of the sector and deposit them on respective areas of the pad support. Each area is associated with a type of pad. The pad support further comprises an additional area allowing to flip one of the pads if it is not deposited in the correct direction for being gripped by the third robot arm 116 for subsequent insertion. The third robot arm 116 is configured to perform such a flipping, if necessary.

Figure 17:
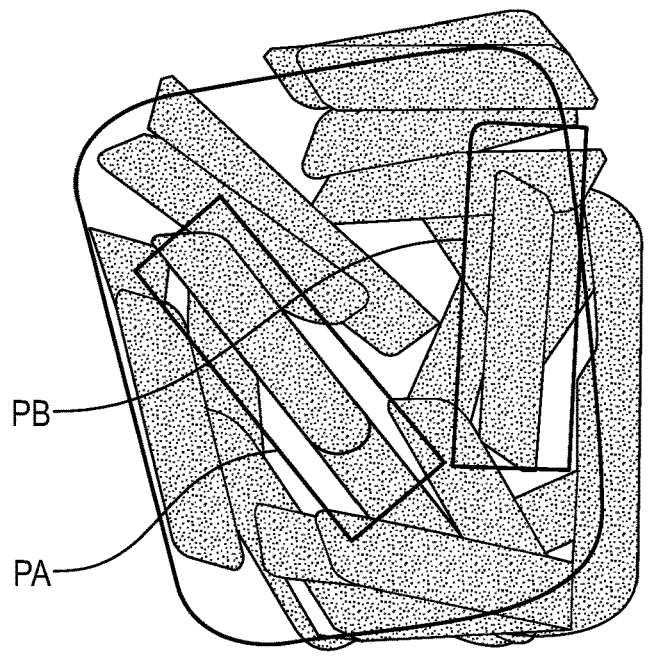
FIG. 17 is a schematic view of the identification of two grippable pads in a bin of the pad preparation system of FIG. 11.

The pad preparation system comprises a pad identification means configured to identify at least one sealing pad that is grippable in a bin, i.e., shaped to be gripped by the gripping means 155 of the fourth robot 154. Preferably, the pad identification means comprises a camera 156 and implements a shape recognition software. An example of the acquisition by the camera 156 of the pad identification system is shown in FIG. 17 and will be detailed later.

The pad preparation system further comprises a system 160 for generating a gas jet inside the bin containing pads of the defined type if no sealing pads is grippable by the gripping means of the fourth robot arm 154. The system 160 for generating the gas jet is attached to a cover 162 intended to close at least the bin 152 in order to hold the pads 35, 37 in the bin 152 during the air injection as shown in FIG. 11.

The third robot arm 116 is adapted to grip a sealing pad 35, 37 supported by the pad support for insertion into a slot in the sector. For this purpose, the third robot arm 116 comprises a gripper such as a small sized clamp adapted to grip a predefined sealing pad 35, 37. The pad to be inserted is predefined according to the slot intended to receive it.

The third robot arm 116 is configured to position and orient the sealing pad 35, 37 gripped relative to the sector 34 supported by the transport pallet 102 for insertion into the slot intended to receive it from one of the side faces of the sector. For this purpose and in order to ensure the delicate successive insertion of the pads into the slots of the sector, the third robot arm 116 supporting the pads is orientable in a predetermined position via orientation means and comprises a means for automated identification of the slots and their characteristics in the predetermined position of the sector on the transport pallet, whether they are provided in the side face of the inner platform 40 and/or the outer platform 38.

Advantageously, the automated means for identifying the slots is configured to identify, for each slot, the type of the sealing pad to be inserted into the slot intended to receive it in accordance with the identified characteristics of said slot and thus to identify the sealing pad of said type supported by the pad support. To this end, the automated identification means comprises a camera supported by the third robot arm 116 and implements a shape recognition software which allows, in particular, to identify the shape of the slots, even if partially covered with grease, by extrapolation. Thus, each predefined sealing pad can be inserted into the slot intended to receive it according to the identified characteristics of said slot in a precise and automated manner.

Figure 14:
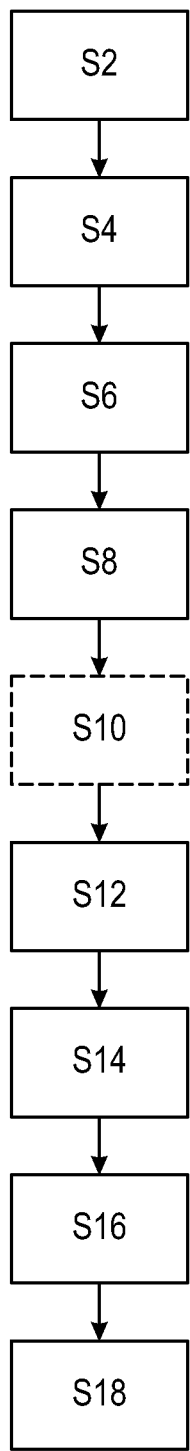
FIG. 14 is a flowchart of a method for assembling the turbine stators of a turbine according to the present disclosure.

A method of pre-assembling, according to the present disclosure, the turbine stators of a turbine by means of an installation as described above will now be described in detail with reference to FIG. 14.

The method comprises a step S2 of providing an input carriage 105 supporting the set of the sectors intended to form the turbine stators of the turbine; and an output carriage 108 comprising a plurality of trays 109, each tray being associated with a turbine stator of the turbine.

The input carriage 105 and the output carriage 108 are installed on the input 104 and output 106 docks respectively by an operator.

The input carriage 105 is filled with the set of the sectors 34 intended to form the set of the turbine stators of the various stages of a turbine. Thus, the method for pre-assembling the turbine stators is implemented only once for an entire engine, thus limiting the number of operator interventions and increasing the efficiency and profitability of the installation.

Similarly, the output carriage 108 is intended to receive the set of the pre-assembled sectors as a turbine stator of a single turbine stage on each tray 109, also limiting the number of operator interventions and thereby increasing the efficiency of the installation.

The operator implement the automated method for preparing the sectors and their pre-assembly in the form of turbine stators via the console of the installation, specifying the model of turbine and engine to be manufactured and consequently the turbine stators to be assembled.

For each sector 34 supported by the input carriage 105, the method comprises an automated step S4 of gripping one of the sectors by the gripping tool 114 of the first robot arm 112, a clamp as shown in FIG. 8. If necessary, the sector 34 is re-aligned in the clamp 114, i.e., the position and/or the orientation of the sector with respect to the clamp is changed to correspond to a predetermined theoretical position.

The method also advantageously comprises an automated step S6 of identifying the sector by the automated identification system 122 and consequently of identifying the turbine stator 32 with which the sector 34 being prepared is associated and the tray 109 of the output carriage 108 corresponding to the determined turbine stator on which to deposit the sector and position it in the right place so as to pre-assemble the given turbine stator.

To this end, the identification step S6 comprises a step of reading a surface marking corresponding to a reference of the sector 34 and a step of associating the read reference of the sector with a given turbine stator of the turbomachine, i.e. with a stage of the turbomachine, as a function of the database of the references of the set of the sectors intended to form the turbine stators of the turbomachine. The reference is read by an acquisition means, for example a camera associated with a character recognition software, the acquisition means being supported by another robot arm of the installation, preferably by the second robot arm 142.

The reading step advantageously comprises the reading of each character of the reference and the verification of each invariant character read by comparison with the invariant characters of the references in the database, and the identification of each varying character read by comparison with the varying characters of the references in the database.

In fact, for each stage of the turbomachine, the identification of possible markings allows to identify variant and invariant characters in the references of the sectors of a same turbine stator and even to determine a limited number of possibilities for the variant characteristics. Thus, this reading step as described above allows to limit the risk of reading one character instead of another and thus to make the reading of the references of the sectors more reliable.

Advantageously, the method further comprises for each sector 34 supported by the first robot arm 112 an automated step S8 of controlling the quality of the sector by the device 124 for controlling the quality. During this step, several photos are taken from various orientations of the sector. FIG. 10 illustrates this photographing by an image capture means 126 while the sector 34 is supported and oriented by the first robot arm 112.

In particular, during this controlling step at least the quality of the slots provided in the transverse walls of the sector, the quality of the trailing edges and the surfaces of the vanes of the sector and the quality of the honeycomb abradable material block of the sector are controlled.

The control of the abradable honeycomb material block is carried out from for example two photos in order to have a sufficient image quality to detect the defects in a rather precise way as illustrated on FIG. 10.

At the end of the controlling step, the sector is deposited by the first robot arm 112 on a pallet 102 and conveyed to the next functional unit for the next step of preparing the sector.

If an impermissible defect is detected in one of the parts of the sector, the defective sector is deposited on a pallet 102 of the conveying device 101 and conveyed to a manual control device. The manual control is performed by an operator to confirm or deny that the defect is inadmissible for recycling and replacement by another sector or for a possible repair. In the latter case, or if the defect is finally allowed, the sector is placed back on a pallet 102 and conveyed to the next functional unit for the next step of preparing the sector.

For a determined number of turbine stators of the turbine and consequently for their predefined sectors intended to form them, the method comprises an automated step S10 of dropping a foil, or anti-wear device. The foils to be equipped to the predefined sectors are arranged on a multiple foil support. A robot arm of the installation, preferably the first robot arm 112, grips a foil from the multi-support and deposit it on the intermediate support in a predetermined position and orientation so that the foil can be secured to the sector. Then, the first robot arm 112 grip one of the predefined sectors supported by a transport pallet 102 and positions and orients it with respect to the foil dropped on the intermediate support so as to secure the foil on the sector, for example by clipping it onto the front hooking means 48 of the sector 34.

The sector is then deposited by the first robot arm 112 onto a transport pallet 102 and conveyed to the next functional unit for the next step of preparing the sector. Thus, the first robot arm 112 is then available to grip another sector 34 in the input carriage 104 and repeat the steps S4 to S10.

The method continues for the sector previously identified, controlled and possibly equipped with a foil, supported by a transport pallet 102 through an automated convey step to the cleaning and greasing device 140.

The method comprises an automated step S12 of cleaning, preferably by compressed air, the slots 39, 41 of the sector 34 by the automated cleaning system 140. During this step, the sector 34 supported by the transport pallet 102 is gripped by the second robot arm 142. This latter positions and orients the sector relative to a compressed air jet nozzle to clean the interior of the slots 39, 41.

The method further comprises a step, illustrated in FIG. 13, of injecting S14 the fatty material into the slots in areas 176 around each identified intersection. The determination of these zones 176 is described below.

During this step, a robot arm, preferably the second robot arm 142 supports the support 34 and positions and orients it relative to the greasing system 164, in particular relative to the injection means 166 to deposit the grease within at least a portion of the slots 39, 41.

The cleaned and greased sector is deposited by the second robot arm 142, or any other robot arm supporting it, onto a transport pallet 102 and conveyed to the automated device 110 for inserting sealing pads. Thus, the second robot arm 142, or any other robot arm of the cleaning and greasing device, is then available to grip another sector 34 supported by another transport pallet and repeat the cleaning S12 and greasing steps S14.

The method continues for the cleaned and greased sector, supported by a pallet 102 of the conveying device 101, with an automated step of inserting S16 the sealing pads into the slots in a side face of the sector to form an equipped sector.

This step S16 comprises an automated pre-step S161 of preparing sealing pads 35, 37 as shown in FIG. 11.

This step S161 of preparing pads comprises a sub-step S1611 of identifying in the receptacle 150 at least one sealing pad grippable by the gripping means of the fourth robot arm 154. This identification step is carried out by means of a camera 156, shown in FIG. 11, and a shape recognition software.

FIG. 17 illustrates an image acquired by the camera 156 of a top view of a bin 152 containing bulk pads. During this step, the shape of the pads is detected and in the example shown in FIG. 17, two grippable pads are identified: a first one noted PA is identified in the right direction and a second one noted PB is identified in reverse.

A pad in the correct direction means that it can be inserted directly into a slot by the third robot arm 116 of the insertion device, whereas a pad in the reverse direction means that it must be flipped by the third robot arm 116 before being inserted into a slot.

The pad preparing step S161 then comprises a sub-step S1612 of gripping by the fourth robot arm 154 of the device 110, in the receptacle 150, of a grippable pad, thanks to its gripping tool, preferably a suction finger, and of depositing the pad on the zone corresponding to the type of the gripped pad of the pad support.

The fourth robot arm 154 successively grip pads of different types in different bins in order to feed the different areas of the pad support. The different types of pads are intended for different slots in the sector.

Figure 12:
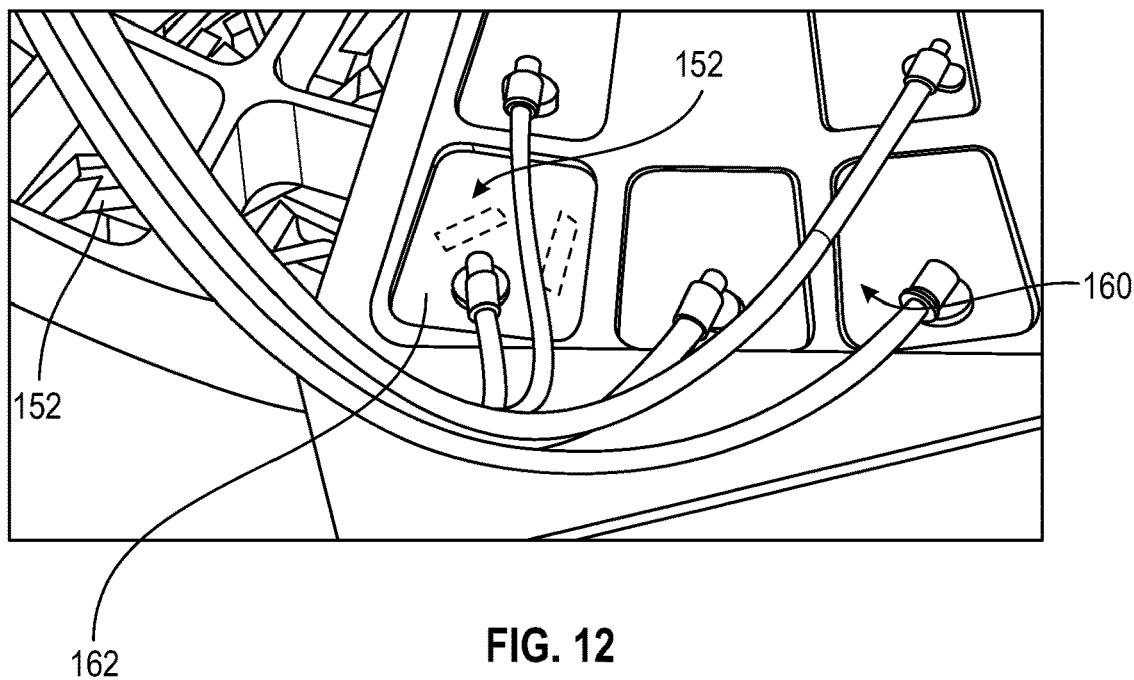
FIG. 12 shows an enlarged view of the preparation system of FIG. 10 receiving a gas jet by a mixing system.

If no sealing pad is grippable by the gripping means in the bin, a gas jet is generated within at least one bin 152 of the receptacle 150 to lift and mix the sealing pads to provide a grippable pad as shown in FIG. 12 in a sub-step S1613.

This sub-step S1613 can be repeated if there is still no grippable pad. After three successive blowing steps, if no pad is grippable, a warning message is generated on the console for the operator.

The automated insertion step S16 further comprises a pad orientation step S162.

This orientation step S162 comprises a sub-step S1621 of gripping a pad 35, 37 by the third robot arm 116, the pad 35, 37 being supported by the pad support.

If the gripped pad is not in the correct direction, the third robot arm 116 uses the additional area of the pad support to flip the pad to be in the correct direction during a sub-step S1622.

During this orientation step S162 the gripped sealing pad 35, 37 is positioned and oriented with respect to the sector 34 supported by the transport pallet 102 for insertion into the slot intended to receive it from one of the side faces of the sector.

To this end, the orientation step S162 comprises a sub-step S1623 of automated identification of the slots and their characteristics in the predetermined position of the sector on the transport pallet whether they are provided in the side face of the inner platform 40 and/or the outer platform 38. This sub-step allows the identification, for each slot of the sector, of the type of the sealing pad to be inserted in the slot intended to receive it according to the identified characteristics of said slot. This identification is carried out by a camera supported by the third robot arm 116, supporting the pad to be inserted, and implements a shape recognition software allowing in particular to identify the shape of the slots even partially covered with fat by extrapolation.

The sector 34 is supported by the transport pallet and is locked in a predetermined position and orientation referred to as theoretical, allowing the characteristics identification of the slots. This predetermined position and orientation is verified by the third robot arm 116. Thus, the set of the slots in the outer platform must be located in a first area 172 shown continuously in FIG. 15, and similarly for the inner platform shown in FIG. 16.

Figure 15:
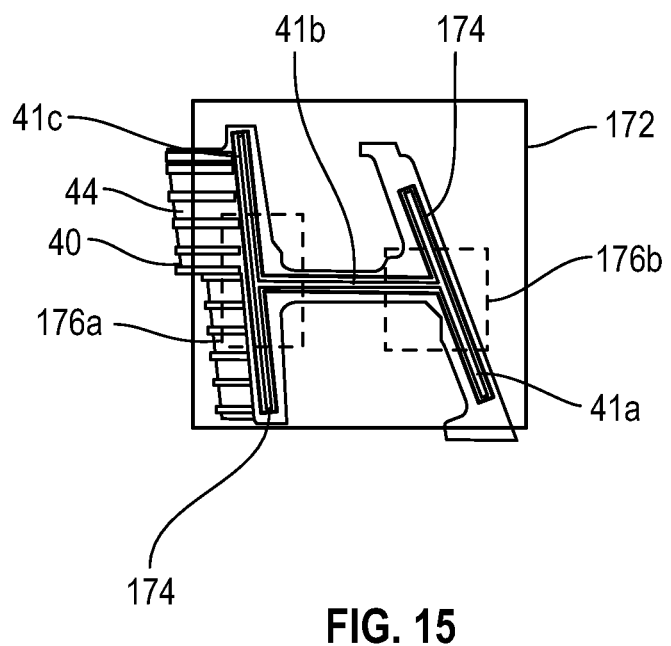
FIG. 15 is a schematic view of the identification of areas related to the slots of the outer platform of a sector.
Figure 16:
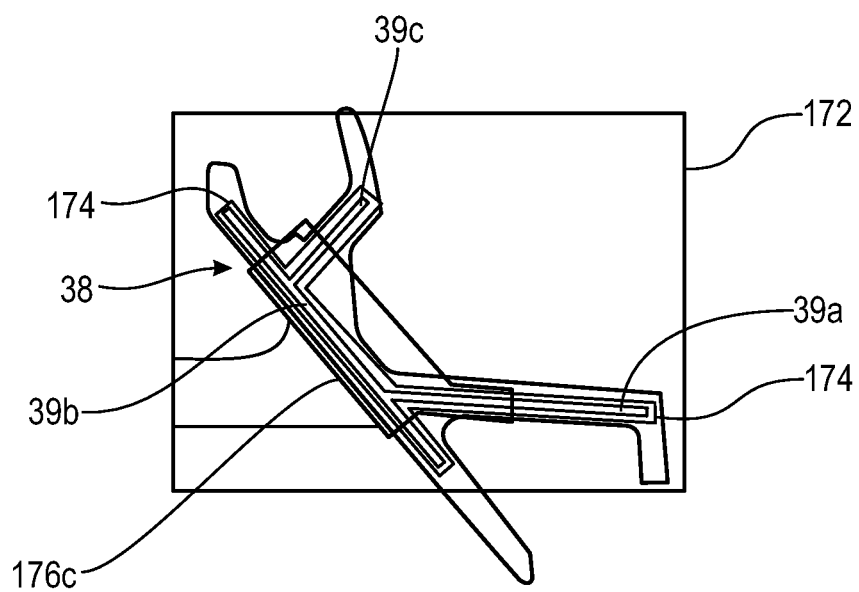
FIG. 16 is a schematic view of the identification of areas related to the slots of the inner platform of a sector.

The identification step comprises an automated recognition of the slots and of the characteristics of the slots of the sector in the predetermined position, in particular their orientation, their dimensions, their patterns and their intersections, thanks to the camera supported by the third robot arm 116 associated with the shape recognition software, which allows in particular to identify the shape of the slots, even if they are partially covered with grease, by extrapolation. FIGS. 15 and 16 illustrate, for the outer platform and the inner platform respectively, the recognition of the slots surrounded by a dotted area 174 and the definition of areas 176 around each intersection, marked by dashes in FIGS. 15 and 16. Thus, two areas 176a, 176b for the deposit of the grease are identified for a pattern of slots in H as seen in FIG. 15 while only one area 176c for the grease is identified in FIG. 16 for a pattern of slots in K.

Figure 18:
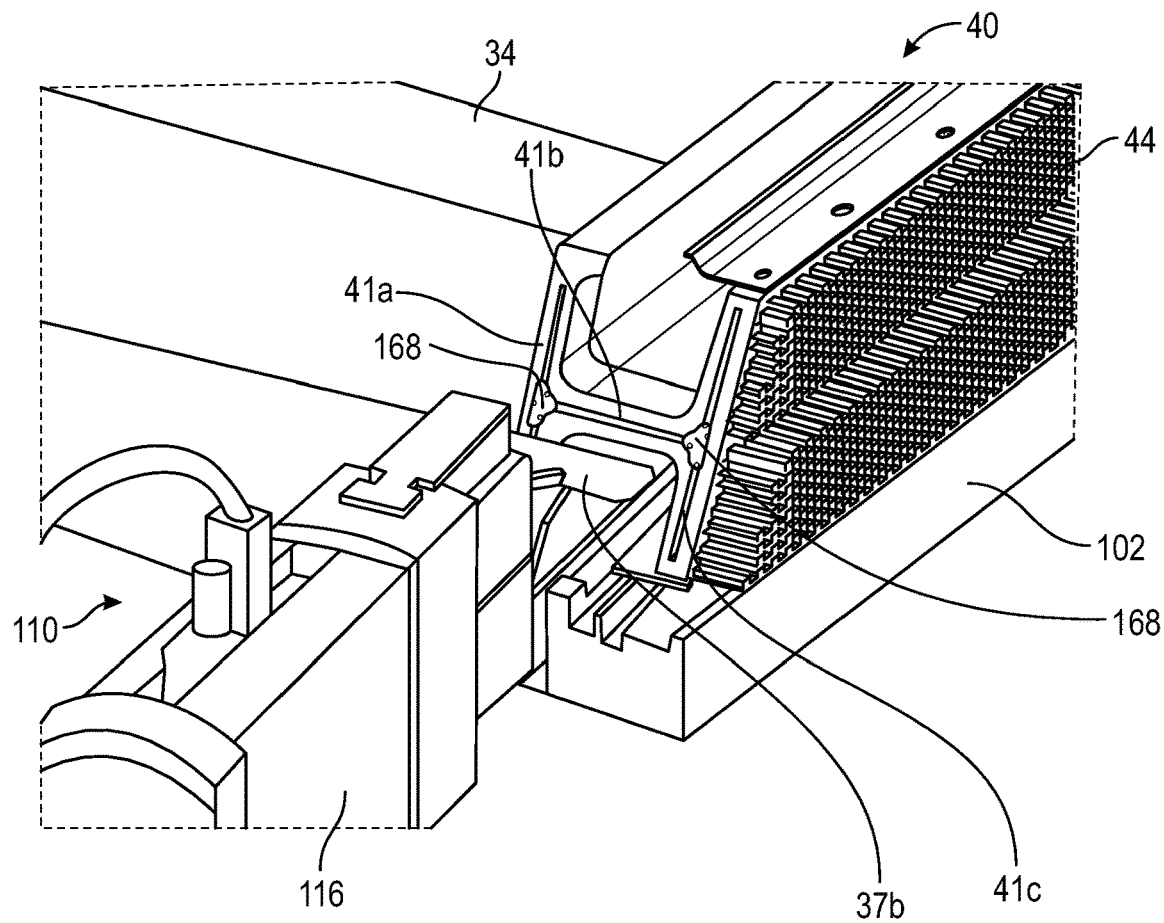
FIG. 18 is a schematic view of the automated step of inserting a pad into a slot in a sector.

FIG. 18 illustrates the insertion of, for example, a pad 37b into a radial slot 41b of the inner platform of the sector of FIG. 4. The grease 168 deposited at the two intersections of the radial slot 41b with each tangential slot 41a, 41c is also clearly visible.

The sector thus equipped with pads is conveyed by the pallet 102 of the conveying device 101 to the output dock 106.

Figure 19:
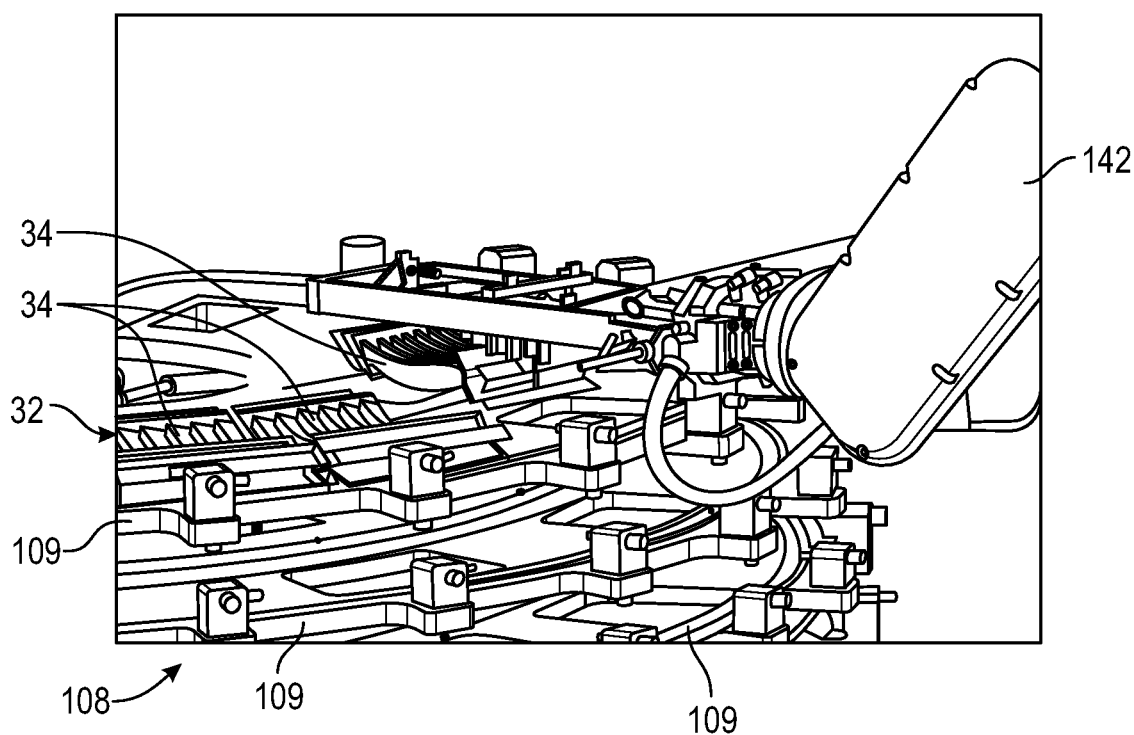
FIG. 19 is a schematic view of the step of depositing a sector equipped on a tray associated with the corresponding turbine stator.

During an automated step S18, the second robot arm 142 of the installation grips the equipped sector and deposit it on the output carriage 108, more precisely on the tray 109 associated with the determined turbine stator so as to pre-assemble the determined turbine stator as illustrated in FIG. 19.

To this end, the upper trays of the output carriage 108 are lifted by the first actuator relative in relation to the tray 109 of the turbine stator being assembled allowing the upper trays to be disengaged so as to make the tray 109 on which the equipped sector is to be dropped accessible. By upper tray is meant the trays located above the tray of the turbine stator being pre-assembled, i.e. associated with the equipped sector supported by the second robot arm 142.

The tray of the turbine stator being assembled is rotated on itself by the second actuator in order to make accessible the angular depositing area adapted to the equipped sector supported by the second robot arm 142.

When all the equipped sectors are deposited on the trays 109 of the output carriage 108, the turbine stators of the turbine are thus pre-assembled. The final assembly of the turbine stators consists in juxtaposing all the equipped sectors of the same tray by inserting the free end of the pads of one equipped sector into the slots opposite the neighbor equipped sector until the whole ring of stationary bladings is formed.

The automated steps of this method are implemented by computer.

The invention claimed is:

1. A control device of sectors for the assembly of turbine stators of a turbine, each turbine stator being formed of an assembly of sectors juxtaposed to one another, each sector comprising a reference, the device comprising:
   an automated system configured to identify each sector, the automated system comprising means for reading the reference corresponding to each sector;
   a database of the references of the sectors that form the turbine stators of the turbine; and
   means for associating the read reference of the sector with a determined turbine stator of the turbine.

2. The control device according to claim 1, wherein the references of the sectors comprise characters that vary from one sector to another sector and characters that are invariant from one sector to another sector of the same turbine stator, wherein the automated system for identifying the sector comprises:
   means for verifying each invariant character read by comparison with the invariant characters of the references of the database; and
   means for identifying each variant character read by comparison with the variant characters of the references of the database.

3. The control device according to claim 1, wherein each sector comprises an inner platform, an outer platform, vanes each comprising a trailing edge and being attached between said inner platform and said outer platform, and a block of abradable honeycomb material extending towards the inside of the inner platform between the side faces, and wherein the database comprises a set of technical characteristics of the sector associated with each reference, the set of technical characteristics including at least:
   a determined number of slots arranged in side faces of the sector;
   technical characteristics of the slots;
   physical characteristics of the sealing pads intended to be inserted in each of the slots;
   a determined number of vanes of the sector; and
   an angular position of the sector in the determined turbine stator.

4. The control device according to claim 3, further comprising an automated system of quality control of the sector configured to control the quality, according to the technical characteristics of the sector, of:
   the slots arranged in the side faces of the sector;
   the trailing edges and the surfaces of the vanes; and
   the block of abradable honeycomb material.

5. The control device according to claim 1, further comprising image capturing means of the sector according to different orientations of the sector with respect to the image capturing means, the sector being supported by a robot arm movable with respect to the image capturing means.

6. A control method of the sectors for the assembly of the turbine stators of a turbine by means of the control device according to claim 1, comprising for each sector the automated steps of:

reading the reference of the sector; and associating the read reference of the sector with a determined turbine stator of the turbine as a function of the database of the references of the sectors intended to form the turbine stators of the turbine.

7. The control method according to claim 6, wherein the references of the sectors comprise characters that vary from one sector to another sector and characters that are invariant from one sector to another sector of the same turbine stator, the method comprising an automated step for identifying the sector comprising:

verifying each invariant character read by comparison with the invariant characters of the references of the database; and identifying each variant character read by comparison with the variant characters of the references of the database.

8. A control method of the sectors for the assembly of the turbine stators of a turbine by means of the control device according to claim 3, comprising for each sector the automated steps of:

reading the reference of the sector;

associating the read reference of the sector with a determined turbine stator of the turbine as a function of the database of the references of the sectors intended to form the turbine stators of the turbine; and performing quality control of the sector according to the technical characteristics of the sector, including quality control of:

the slots arranged in the side faces of the sector;

the trailing edges and the surfaces of the vanes; and the block of abradable honeycomb material.

\* \* \* \* \*